(12) United States Patent
Pasadyn et al.

(10) Patent No.: US 6,968,252 B1
(45) Date of Patent: Nov. 22, 2005

(54) METHOD AND APPARATUS FOR DISPATCHING BASED ON METROLOGY TOOL PERFORMANCE

(75) Inventors: Alexander J. Pasadyn, Austin, TX (US); James B. Stirton, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 91 days.

(21) Appl. No.: 10/619,850

(22) Filed: Jul. 14, 2003

(51) Int. Cl.[7] .......................... G01N 21/88; G06F 19/00
(52) U.S. Cl. ...................... 700/110; 700/175; 702/182
(58) Field of Search ......................... 700/90, 108, 95, 700/96, 109, 110, 175; 702/182–184, 188

(56) References Cited

U.S. PATENT DOCUMENTS

| 6,392,403 | B1 * | 5/2002 | Conboy et al. | .......... | 324/158.1 |
| 6,408,219 | B2 * | 6/2002 | Lamey et al. | ............ | 700/110 |
| 6,790,686 | B1 * | 9/2004 | Purdy et al. | .............. | 438/14 |
| 6,871,114 | B1 * | 3/2005 | Green et al. | ............. | 700/175 |
| 2003/0029383 | A1 * | 2/2003 | Ward et al. | .............. | 118/719 |
| 2005/0094138 | A1 * | 5/2005 | Hasan | ................ | 356/237.5 |

* cited by examiner

Primary Examiner—Marc S. Hoff
Assistant Examiner—Paul Kim
(74) Attorney, Agent, or Firm—Williams, Morgan & Amerson

(57) ABSTRACT

A method for dispatching based on metrology tool performance includes determining a precision metric associated with each of a plurality of metrology tools. A metrology request including context information is generated. A precision requirement for the metrology request is identified based on the context information. A set of the metrology tools capable of satisfying the metrology request is identified based on the precision requirement and the precision metrics. A manufacturing system includes a manufacturing execution system server and a metrology monitor. The manufacturing execution system server is configured to generate a metrology request including context information. The metrology monitor is configured to determine a precision metric associated with each of a plurality of metrology tools, identify a precision requirement for the metrology request based on the context information, and identify a set of the metrology tools capable of satisfying the metrology request based on the precision requirement and the precision metrics.

17 Claims, 3 Drawing Sheets

METHOD AND APPARATUS FOR DISPATCHING BASED ON METROLOGY TOOL PERFORMANCE

BACKGROUND OF THE INVENTION

1. Field of the Invention

This invention relates generally to an industrial process, and, more particularly, to a method and apparatus for dispatching based on metrology tool performance in a semiconductor device manufacturing environment.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a wafer using a variety of processing tools, including photolithography steppers, etch tools, deposition tools, polishing tools, rapid thermal processing tools, implantation tools, etc. One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices. Pre-processing and/or post-processing metrology data is supplied to process controllers for the tools. Operating recipe parameters are calculated by the process controllers based on the performance model and the metrology information to attempt to achieve post-processing results as close to a process target value as possible. Reducing variation in this manner leads to increased throughput, reduced cost, higher device performance, etc., all of which equate to increased profitability.

Typically, metrology tools, even tools of the same type and model, have differing precision capabilities. These differences may be caused by various factors, including noise, calibration frequency and accuracy, and inherent tool characteristics. Certain processes in a fabrication facility require high measurement precision. If the precision of the metrology data is not sufficiently high the efficacy of process control or fault detection may actually be reduced by a metrology update, rather than increased. For example, the error in the metrology data may actually cause a process controller to errantly shift its operating settings in such a way that variance is increased.

Typically, when metrology is required for a particular lot, all of the available tools are identified and the lot is assigned to one of the tools based on availability. Because the tools may have varying precision characteristics that are not incorporated into the scheduling decisions, situations may occur where the most precise tools are tied up for metrology events that do not require the higher level of precision. These lots may be then assigned to other metrology tools that are available, but have a lesser degree of precision. As a result the usefulness of the metrology data collected for process control or fault detection may be reduced. Subsequently, process control activities may not be effective and/or errant fault detections may be identified. In general, these situations reduce the efficiency and profitability of the fabrication facility.

The present invention is directed to overcoming, or at least reducing the effects of, one or more of the problems set forth above.

SUMMARY OF THE INVENTION

One aspect of the present invention is seen in a method for dispatching based on metrology tool performance. The method includes determining a precision metric associated with each of a plurality of metrology tools. A metrology request including context information is generated. A precision requirement for the metrology request is identified based on the context information. A set of the metrology tools capable of satisfying the metrology request is identified based on the precision requirement and the precision metrics.

Another aspect of the present invention is seen in a manufacturing system including a manufacturing execution system server and a metrology monitor. The manufacturing execution system server is configured to generate a metrology request including context information. The metrology monitor is configured to determine a precision metric associated with each of a plurality of metrology tools, identify a precision requirement for the metrology request based on the context information, and identify a set of the metrology tools capable of satisfying the metrology request based on the precision requirement and the precision metrics.

BRIEF DESCRIPTION OF THE DRAWINGS

The invention may be understood by reference to the following description taken in conjunction with the accompanying drawings, in which like reference numerals identify like elements, and in which.

Figure 1:
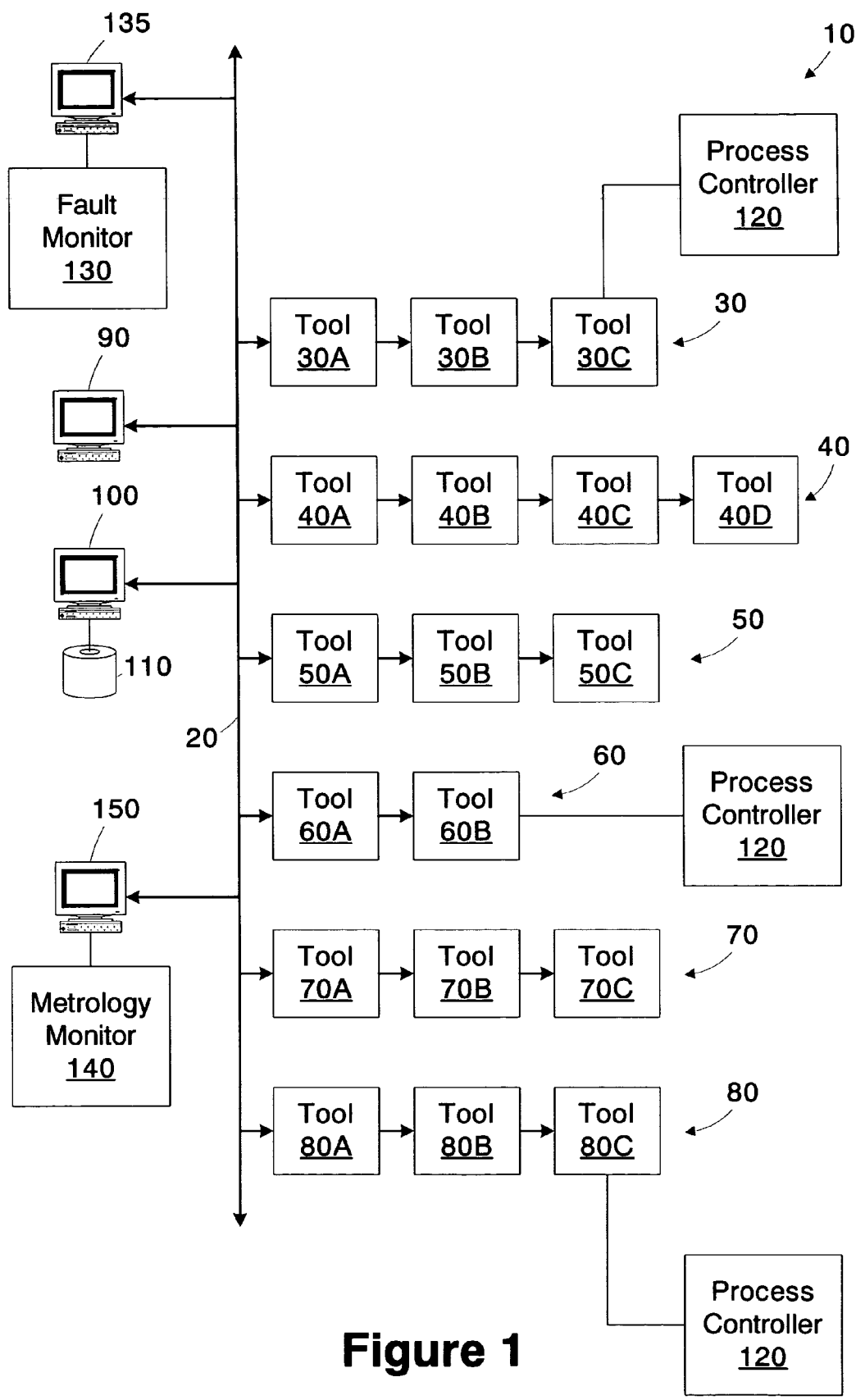
FIG. 1 is a simplified block diagram of a manufacturing system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

A network 20 interconnects various components of the manufacturing system 10, allowing them to exchange information. The illustrative manufacturing system 10 includes a plurality of tools 30–80. Each of the tools 30–80 may be coupled to a computer (not shown) for interfacing with the network 20. The tools 30–80 are grouped into sets of like tools, as denoted by lettered suffixes. For example, the set of tools 30A–30C represent tools of a certain type, such as a chemical mechanical planarization tool. A particular wafer or lot of wafers progresses through the tools 30–80 as it is being manufactured, with each tool 30–80 performing a specific function in the process flow. Exemplary processing tools for a semiconductor device fabrication environment include metrology tools, photolithography steppers, etch tools, deposition tools, polishing tools, rapid thermal processing tools, implantation tools, etc. The tools 30–80 are illustrated in a rank and file grouping for illustrative purposes only. In an actual implementation, the tools 30–80 may be arranged in any physical order or grouping. Additionally, the connections between the tools in a particular grouping are meant to represent connections to the network 20, rather than interconnections between the tools 30–80.

A manufacturing execution system (MES) server 90 directs high level operation of the manufacturing system 10. The MES server 90 monitors the status of the various entities in the manufacturing system 10 (i.e., lots, tools 30–80) and controls the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, etc.

Process controllers 120 may be associated with one or more of the process tools 30–80. The process controllers 120 determine control actions for controlling selected ones of the tools 30–80 serving as process tools based on metrology data collected during the fabrication of wafers (i.e., by others of the tools 30–80 serving as metrology tools). The particular control models used by the process controllers 120 depend on the type of tool 30–80 being controlled. The control models may be developed empirically using commonly known linear or non-linear techniques. The control models may be relatively simple equation-based models (e.g., linear, exponential, weighted average, etc.) or a more complex model, such as a neural network model, principal component analysis (PCA) model, partial least squares projection to latent structures (PLS) model. The specific implementation of the control models may vary depending on the modeling techniques selected and the process being controlled. The selection and development of the particular control models would be within the ability of one of ordinary skill in the art, and accordingly, the control models are not described in greater detail herein for clarity and to avoid obscuring the instant invention. Typically, metrology data is employed by the process controllers 120 in two contexts, first in generating control actions for adjusting the recipes of various tools 30–80, and second in updating the control models used to generate the control actions.

In some embodiments, a fault monitor 130 executing on a workstation 135 may be provided for monitoring fault conditions with the tools 30–80 and/or devices manufactured. For example, a particular tool 30–80 may be performing poorly or feature formed on a device may have a dimension outside an acceptable range of values. The fault monitor 130 may implement one or more fault detection and classification (FDC) models to evaluate the condition of the various entities or devices. Metrology data is employed by the fault monitor 130 to identify fault conditions with various tools 30–80 or workpieces and also to update the FDC model(s) employed to identify the degraded conditions.

The manufacturing system 10 also includes a metrology monitor 140 executing on a workstation 150. The metrology monitor 140 monitors the performance of various metrology tools 30–80 in the manufacturing system 10 and interfaces with the MES server 90 to influence dispatch decisions based on the capabilities of the metrology tools 30–80 and the requirements of the different entities in the manufacturing system 10. Although the metrology monitor 140 and MES server 90 are illustrated as separate entities, it is contemplated that their functions may be integrated into a single unit.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The processing and data storage functions are distributed amongst the different computers or workstations in FIG. 1 to provide general independence and central information storage. Of course, different numbers of computers and different arrangements may be used without departing from the spirit and scope of the instant invention.

Figure 2:
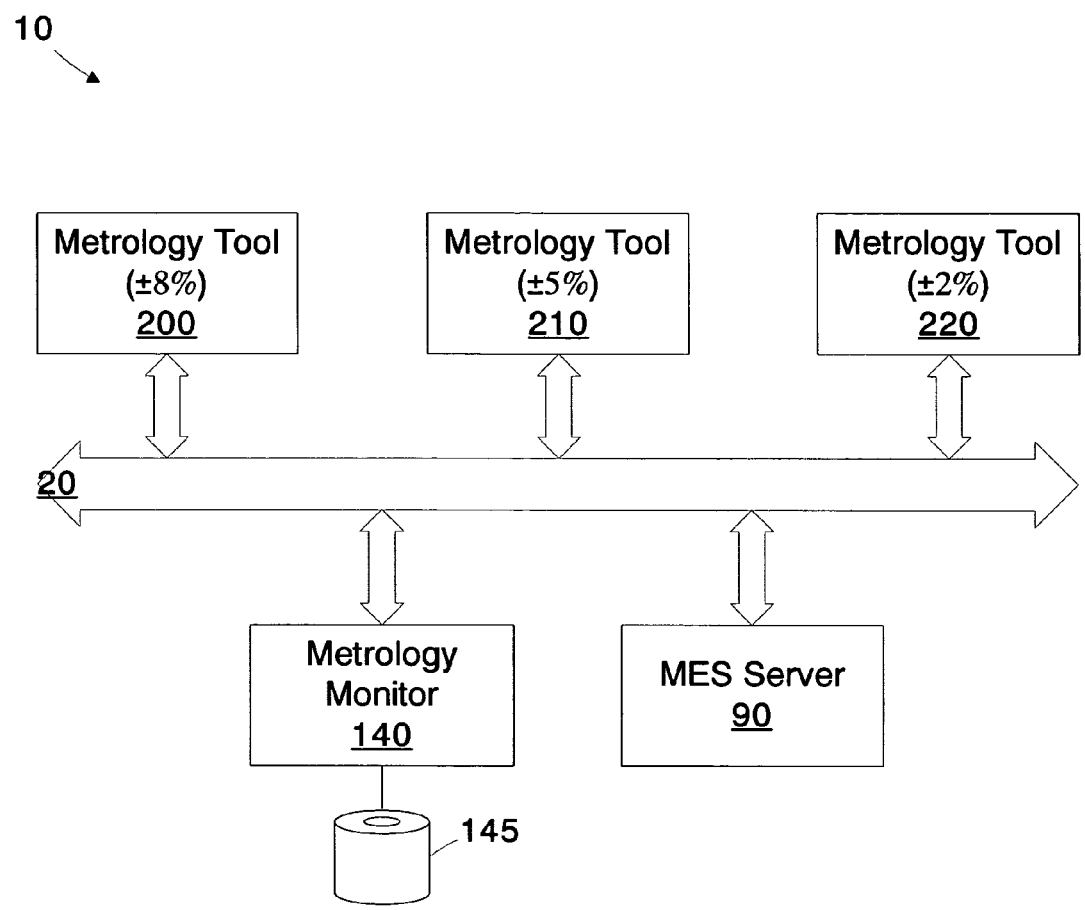
FIG. 2 is a simplified block diagram of a portion of the manufacturing system of FIG. 1.

Turning now to FIG. 2, a simplified block diagram of a portion of the manufacturing system 10 of FIG. 1 is provided. The MES server 90 and metrology monitor 140 interface with metrology tools 200, 210, 220 (i.e., selected from the tools 30–80 shown in FIG. 1) over the network 20. The metrology monitor 140 monitors the performance of the metrology tools 200, 210, 220 over time to determine their precision. Precision may be determined through calibration procedures or redundant measurement. For example, a measurement taken by one type of tool may be validated by a different more accurate tool (e.g., through a destructive cross section analysis). Based on the collected feedback regarding the accuracy of the metrology tools 200, 210, 220, the metrology monitor 140 assigns a precision metric to each of the metrology tools 200, 210, 220. For illustrative purposes, the metrology tool 200 is assumed to have a precision metric of ±8%, the metrology tool 210 has a precision metric of ±5% and the metrology tool 220 has a precision metric of ±2%. The metrology tools 200, 210, 220 may be of the same or different type.

The MES server 90 initiates metrology events for a variety of purposes. For example, metrology data may be needed by a process controller 120 to generate a control action for one of the tools 30–80. A process controller 120 may also require metrology data to update a state of its control model. The fault monitor 130 may require metrology data to perform an FDC check or to update its FDC model. Events initiated by the MES server 90 may include context information that indicates the type or operation required. The context data could directly include the precision required for the metrology data, or alternatively, the precision requirements may be inferred from the type of metrology event requested. For example, the metrology monitor 140 may maintain a database 145 relating the various metrology events and to precision requirements.

The MES server 90 interfaces with the metrology monitor 140 to determine the metrology tool(s) 200, 210, 220 capable of providing the metrology services by comparing the precision requirements derived from the context data to the performance metrics maintained for the metrology tools 200, 210, 220. In general, it is preferred to select the metrology tool 200, 210, 220 having the least precision sufficient to satisfy the requirements of the metrology event. The metrology monitor 140 provides the MES server 90 with the identifies of the metrology tools 200, 210, 220 capable of meeting the requirements. The MES server 90 may consider factors other than the precision metric in selecting the metrology tool 200, 210, 220.

In general, by selecting the "worst" metrology tool 200, 210, 220 capable of performing the metrology event, the resources of the more precise tools may be conserved for other events with higher precision requirements. However, a strict scheduling rule may generate a bottleneck at a particular metrology tool 200, 210, 220. For example, a particular metrology tool 200, 210, 220 may have a sizable queue of previously scheduled metrology events. The MES server 90 may elect to use a metrology tool 200, 210, 220 with a higher precision than required to avoid a bottleneck situation. In some cases, the MES server 90 may select a metrology tool 200, 210, 220 that has a lower precision than typically requested for the particular metrology event if the other metrology tools 200, 210, 220 with the requested precision are not available in the desired time frame.

An exemplary scheduling scenario is now discussed in reference to FIG. 2. The MES server 90 initiates the metrology requests shown below in Table 1. Note that the precision requirements may be directly specified in the metrology request or may be inferred from the type of event requested.

TABLE 1

| | Metrology Events | | |
|---|---|---|---|
| Event | Event Context | Precision Required | Capable Tools |
| 1 | Control Action | 5% | 210, 220 |
| 2 | Control Model Update | 3% | 220 |
| 3 | FDC Model Update | 3% | 220 |
| 4 | FDC Check | 10% | 200, 210, 220 |
| 5 | FDC Check | 5% | 210, 220 |

The metrology monitor 140 responds to the requests with the identities of the metrology tools 200, 210, 220 capable of meeting the precision requirements. If the MES server 90 were to implement a "worst" tool approach, it may result in a bottleneck situation for the metrology tool 210. Accordingly, the MES server 90 may shift some of the metrology events to the higher precision metrology tool 220. In another case where the higher precision metrology tool 220 is not available (e.g., due to other events, maintenance, etc.), the MES server 90 may shift some of the events to the less precise tool 200 to avoid delays in the process flow.

Figure 3:
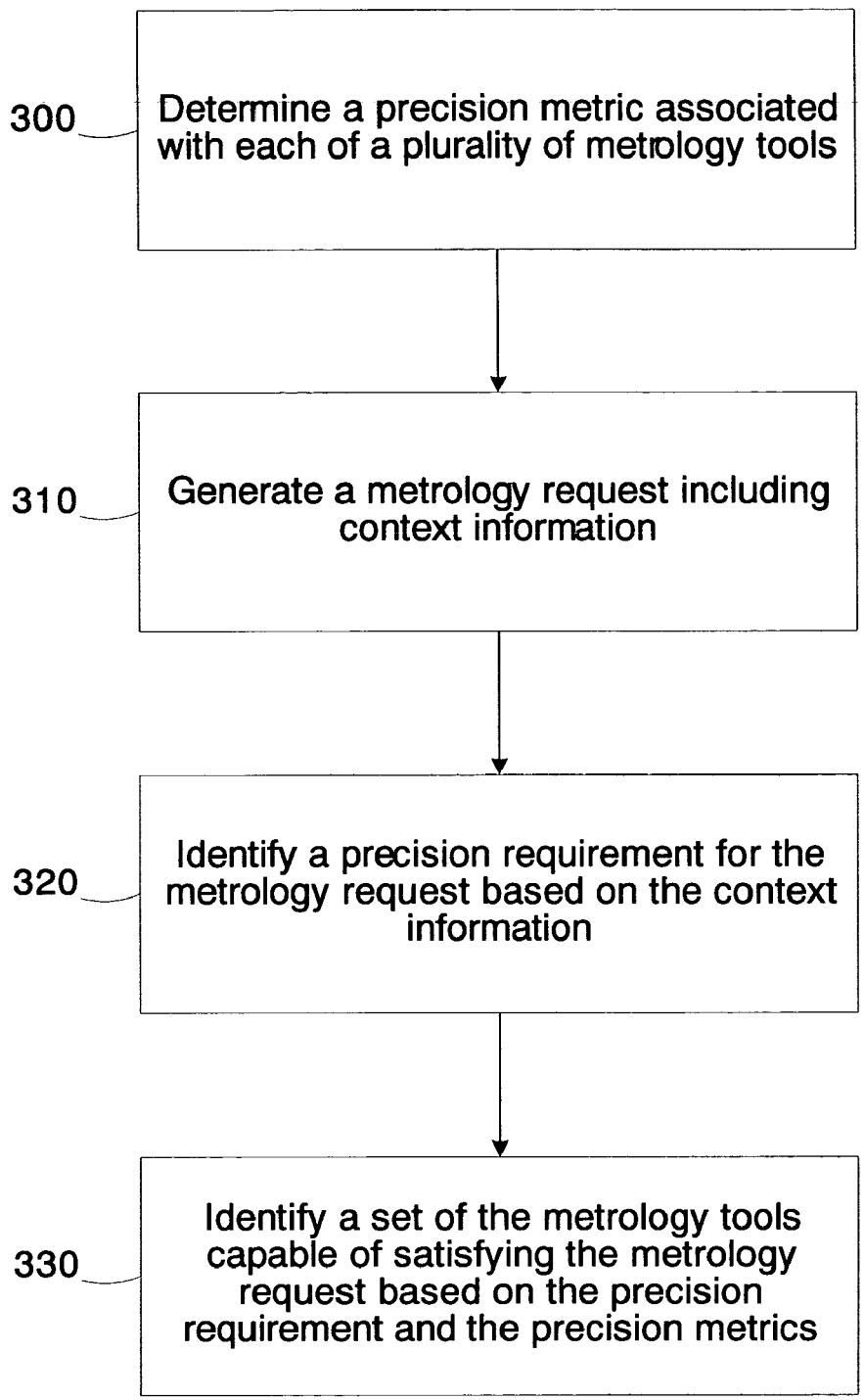
FIG. 3 is a simplified flow diagram of a method for dispatching based on metrology tool performance in accordance with another illustrative embodiment of the present invention.

Turning now to FIG. 3, a simplified flow diagram of a method for dispatching based on metrology tool performance in accordance with another illustrative embodiment of the present invention is provided. In block 300, a precision metric associated with each of a plurality of metrology tools is determined. In block 310, a metrology request including context information is generated. In block 320, a precision requirement for the metrology request is identified based on the context information. In block 330, a set of the metrology tools capable of satisfying the metrology request is identified based on the precision requirement and the precision metrics.

By coordinating the needs of the various consumers of metrology data with the determined performance of the metrology resources capable of providing the metrology data, lots may be scheduled in a manner that increases efficiency and helps ensure the suitability of the metrology data for its intended purpose. Both increased efficiency and improved data suitability improve the effectiveness of the manufacturing system 10 and thus tend to increase its profitability.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
    determining a precision metric associated with each of a plurality of metrology tools;
    generating a metrology request including context information;
    identifying a precision requirement for the metrology request based on the context information, wherein identifying the precision requirement comprises:
        extracting a metrology event type from the context information, and
        associating the metrology event type with the precision requirement; and
    identifying a set of the metrology tools capable of satisfying the metrology request based on the precision requirement and the precision metrics.

2. The method of claim 1, further comprising selecting one of the metrology tools from the set.

3. The method of claim 2, wherein selecting the one of the metrology tools further comprises selecting the one of the metrology tools having an associated precision metric closest to the precision requirement.

4. The method of claim 3, further comprising:
    identifying a bottleneck condition associated with the selected one of the metrology tools; and
    selecting a different one of the metrology tools in the set responsive to identifying the bottleneck condition.

5. The method of claim 4, wherein selecting the different one of the metrology tools further comprises:
    removing the selected metrology tool from the set; and
    selecting one of the metrology tools remaining in the set having an associated precision metric closest to the precision metric.

6. The method of claim 3, further comprising:
    identifying a bottleneck condition associated with the selected metrology tool; and
    selecting a different one of the metrology tools not in the set responsive to identifying the bottleneck condition.

7. The method of claim 1, wherein identifying the precision requirement further comprises extracting the precision requirement from the context information.

8. The method of claim 1, wherein generating the metrology request further comprising generating the metrology request for at least one of a control action event a control model update event, a fault detection event, and a fault detection model update event.

9. A manufacturing system, comprising:
    a manufacturing execution system server configured to generate a metrology request including context information; and
    a metrology monitor configured to determine a precision metric associated with each of a plurality of metrology tools, identify a precision requirement for the metrology request based on the context information by extracting a metrology event type from the context information and associating the metrology event type with the precision requirement, and identify a set of the metrology tools capable of satisfying the metrology request based on the precision requirement and the precision metrics.

10. The system of claim 9, wherein the manufacturing execution system server is configured to select one of the metrology tools from the set.

11. The system of claim 10, wherein the manufacturing execution system server is configured to select the one of the metrology tools having an associated precision metric closest to the precision requirement.

12. The system of claim 11, wherein the manufacturing execution system server is configured to identify a bottleneck condition associated with the selected metrology tool and select a different one of the metrology tools in the set responsive to identifying the bottleneck condition.

13. The system of claim 12, wherein the manufacturing execution system server is configured to discarding the selected metrology from the set and select one of the metrology tools remaining in the set having an associated precision metric closest to the precision metric.

14. The system of claim 11, wherein the manufacturing execution system server is configured to identify a bottleneck condition associated with the selected metrology tool and select a different one of the metrology tools not in the set responsive to identifying the bottleneck condition.

15. The system of claim 9, wherein the metrology monitor is further configured to extract the precision requirement from the context information.

16. The system of claim 9, wherein the manufacturing execution system server is configured to generate the metrology request for at least one of a control action event, a control model update event, a fault detection event, and a fault detection model update event.

17. A system, comprising:
    means for determining a precision metric associated with each of a plurality of metrology tools;
    means for generating a metrology request including context information;
    means for identifying a precision requirement for the metrology request based on the context information, wherein the means for identifying the precision requirement comprises:
        means for extracting a metrology event type from the context information, and
        means for associating the metrology event type with the precision requirement; and
    means for identifying a set of the metrology tools capable of satisfying the metrology request based on the precision requirement and the precision metrics.

* * * * *

UNITED STATES PATENT AND TRADEMARK OFFICE
CERTIFICATE OF CORRECTION

PATENT NO. : 6,968,252 B1 Page 1 of 1
DATED : November 22, 2005
INVENTOR(S) : Alexander J. Pasadyn and James B. Stirton It is certified that error appears in the above-identified patent and that said Letters Patent is hereby corrected as shown below:

<u>Title page,</u>
Item [22], should read -- Filed: July 15, 2003 --.

Signed and Sealed this

Fourth Day of April, 2006

JON W. DUDAS
*Director of the United States Patent and Trademark Office*